United States Patent [19]
Nakagawa et al.

[11] Patent Number: 5,880,212
[45] Date of Patent: Mar. 9, 1999

[54] SURFACE COATING COMPOSITION, CURED FILM THEREOF AND SYNTHETIC RESIN MOLDED ARTICLE COATED WITH CURED FILM

[75] Inventors: Yoshimi Nakagawa, Kyoto; Yukio Yasunori, Osaka; Akira Matsumoto, Soraku-gun; Hisao Shimanoe, Osaka, all of Japan

[73] Assignee: Sumitomo Chemical Company, Limited, Osaka, Japan

[21] Appl. No.: 776,542

[22] PCT Filed: May 29, 1996

[86] PCT No.: PCT/JP96/01441

§ 371 Date: Apr. 29, 1997

§ 102(e) Date: Apr. 29, 1997

[87] PCT Pub. No.: WO96/38507

PCT Pub. Date: Dec. 5, 1996

[30] Foreign Application Priority Data

May 29, 1995 [JP] Japan ................................. 7-130527

[51] Int. Cl.$^6$ ................. C08K 3/08; C08K 5/04
[52] U.S. Cl. .............. 524/779; 524/400; 524/401; 524/436; 528/32; 428/447
[58] Field of Search ................. 524/779, 400, 524/401, 436; 528/32; 428/447

[56] References Cited

U.S. PATENT DOCUMENTS 4,543,398  9/1985  Bany et al. ......................... 525/474
4,606,933  8/1986  Griswold et al. ...................... 427/54.1

FOREIGN PATENT DOCUMENTS 4-80266    3/1992   Japan.
4-49857    8/1992   Japan.
4-292639  10/1992   Japan.
5-8741     2/1993   Japan.
6-136355   5/1994   Japan.

*Primary Examiner*—Kriellion S. Morgan
*Attorney, Agent, or Firm*—Birch, Stewart, Kolasch & Birch, LLP

[57] ABSTRACT

A surface coating composition is disclosed which includes: (1) 100 wt. parts of a polymerizable compound selected from the group consisting of i) photopolymerizable compounds having at least two (meth)acryloyloxy groups in a molecule and ii) heat polymerizable silane compounds having at least two functional groups selected from the group consisting of ether groups and ester groups in a molecule, (2) 0.05 to 20 wt. parts of an organopolysiloxane of the formula [1] described in the specification, and (3) 0.005 to 1.5 moles of an electrolyte salt per one mole of $[R^3O+R^4O]$ which is (moles of the organopolysiloxane)×(the total number of the $R^3O$ and $R^4O$ groups in a molecule). A cured film obtained by polymerizing the surface coating composition, a synthetic resin molded article coated with the cured film, a method for forming a cured film from the surface coating composition, and use of the surface coating composition are also disclosed.

18 Claims, No Drawings

SURFACE COATING COMPOSITION, CURED FILM THEREOF AND SYNTHETIC RESIN MOLDED ARTICLE COATED WITH CURED FILM

FIELD OF THE INVENTION

The present invention relates to a surface coating composition which provides a cured film having excellent abrasion resistance and antistatic properties, a cured film formed from said surface coating composition, and a synthetic resin molded article coated with said cured film.

PRIOR ART

In general, synthetic resins such as acrylic resins, polycarbonate resins, vinyl chloride resins and the like have various characteristics such as easy molding properties, light weight, impact resistance, and are the like, and therefore widely used in various applications. However, appearance of the surfaces of these synthetic resins deteriorate greatly with flaws and adhered dust, since the surfaces are easily flawed and electrostatically charged. In case of transparent resins, their transparency decreases.

To impart antistatic properties to these resins, methods of compounding of antistatic agents, or application or coating of antistatic agents or conductive materials on the surfaces are known.

It is also known to form a cured film having mar resistance on the resin surfaces to reduce flaws.

Furthermore, many proposals have been made on methods for imparting both the antistatic properties and mar resistance to the resin surfaces.

For example, JP-B-4-49857 discloses a synthetic resin film or sheet comprising two laminated resin binder layers which contain a conductive powder comprising tin oxide in a high and low concentrations, respectively.

JP-B-5-8741 discloses a synthetic resin molded article which is coated with a layer of a conductive resin having a cationic quaternary ammonium salt functional group and a layer of a cured polymer crosslinked by irradiation of actinic radiation.

However, the layer containing the conductive powder as disclosed in JP-B-4-49857 has insufficient transparency, and is not suitable for applications in which the resin molded articles are required to have light transmission.

The antistatic properties imparted by the conductive resin layer which is disclosed in JP-B-5-8741 appear through the utilization of moisture in an atmosphere. Therefore, it is often pointed out that the effect of such layer varies greatly with the moisture content in the atmosphere. Furthermore, the production process is complicated, since the layer of the conductive resin for imparting the antistatic properties and the layer of the crosslinked cured polymer for increasing the surface hardness are laminated.

SUMMARY OF THE INVENTION

One object of the present invention is to provide a surface coating composition which can easily form a cured film even in the industry, and which exhibits good antistatic properties and mar resistance independently of moisture without deteriorating optical properties inherent in the resins.

Another object of the present invention is to provide a cured film which exhibits good antistatic properties and mar resistance independently of moisture without deteriorating optical properties inherent in the resins, and a transparent resin molded material coated with such the cured film.

These and other objects and effects will be made apparent from the following descriptions.

Accordingly, the present invention provides a surface coating composition comprising (1) 100 wt. parts of a polymerizable compound selected from the group consisting of i) photopolymerizable compounds having at least two (meth)acryloyloxy groups in a molecule and ii) heat polymerizable silane compounds having at least two functional groups selected from the group consisting of ether groups and ester groups in a molecule, (2) 0.05 to 20 wt. parts of an organopolysiloxane of the formula [1]:

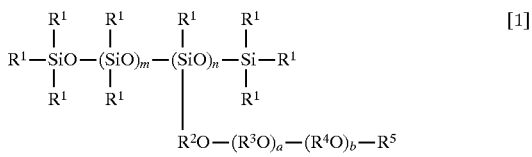

wherein $R^1$ represents a monovalent organic group, $R^2$ to $R^4$ represent independently an alkylene group, $R^5$ represents a hydrogen atom or a monovalent organic group, m is an integer of 0 to 100, n is an integer of 1 to 100, and each of a and b is an integer of 0 to 100, provided that a and b are not 0 (zero) at the same time, and wherein sequences of the —Si($R^1$)$_2$—O— and —Si($R^1$)($R^2$O—)—O— groups and of the —$R^3$O— and —$R^4$O— groups are arbitrary, and (3) 0.005 to 1.5 moles of an electrolyte salt per one mole of [$R^3$O+$R^4$O] which is (moles of the organopolysiloxane) x (the total number of the $R^3$O and $R^4$O groups in a molecule);

a cured film obtained by polymerizing said surface coating composition;

a synthetic resin molded article coated with said cured film;

a method for forming a cured film from said surface coating composition; and use of said surface coating composition in the formation of a cured film.

DETAILED DESCRIPTION OF THE INVENTION

The present invention will be explained in detail.

A polymerizable compound used in the present invention is i) a photopolymerizable compound having at least two (meth)acryloyloxy groups in a molecule or ii) a heat polymerizable silane compound having at least two functional groups selected from the group consisting of ether groups and ester groups in a molecule. The photopolymerizable compound (i) and the heat polymerizable silane compound (ii) may be used in combination.

The photopolymerizable compound having at least two (meth)acryloyloxy groups in a molecule means a compound which has two or more of acryloyloxy or methacryloyloxy groups in a molecule and can be cured by actinic radiation such as ultraviolet ray or electron beams.

Examples of the photopolymerizable compound are poly (meth)acrylates with polyhydric alcohols such as trimethylolpropane tri(meth)acrylate, trimethylolethane tri(meth)acrylate, pentaglycerol tri(meth)acrylate, pentaerythritol tri(meth)acrylate, pentaerythritol tetra(meth)acrylate, glycerol tri(meth)acrylate, dipentaerythritol tri(meth)acrylate, dipentaerythritol tetra(meth)acrylate, dipentaerythritol penta (meth)acrylate, dipentaerythritol hexa(meth)acrylate, tripentaerythritol tetra(meth)acrylate, tripentaerythritol penta (meth)acrylate, 2,2-bis(4-(meth)acryloyloxyethoxyphenyl) propane, diethylene glycol di(meth)acrylate, triethylene glycol di(meth)acrylate, tetraethylene glycol di(meth) acrylate, tripentaerythritol hexa(meth)acrylate, tripentaerythritol hepta(meth)acrylate, and the like; mixed polyesters of saturated or unsaturated acids and (meth)acrylic acid obtained from combinations of compounds such as malonic acid/trimethylolethane/(meth)acrylic acid, malonic acid/trimethylolpropane/(meth)acrylic acid, malonic acid/glycerol/(meth)acrylic acid, malonic acid/pentaerythritol/(meth)acrylic acid, succinic acid/trimethylolethane/(meth) acrylic acid, succinic acid/trimethylolpropane/(meth)acrylic acid, succinic acid/glycerol/(meth)acrylic acid, succinic acid/pentaerythritol/(meth)acrylic acid, adipic acid/trimethylolethane/(meth)acrylic acid, adipic acid/trimethylolpropane/(meth)acrylic acid, adipic acid/pentaerythritol/(meth)acrylic acid, adipic acid/glycerol/(meth)acrylic acid, glutaric acid/trimethylolethane/(meth) acrylic acid, glutaric acid/trimethylolpropane/(meth)acrylic acid, glutaric acid/glycerol/(meth)acrylic acid, glutaric acid/pentaerythritol/(meth)acrylic acid, sebacic acid/trimethylolethane/(meth)acrylic acid, sebacic acid/trimethylolpropane/(meth)acrylic acid, sebacic acid/glycerol/(meth)acrylic acid, sebacic acid/pentaerythritol/(meth)acrylic acid, fumaric acid/trimethylolethane/(meth) acrylic acid, fumaric acid/trimethylolpropane/(meth)acrylic acid, fumaric acid/glycerol/(meth)acrylic acid, fumaric acid/pentaerythritol/(meth)acrylic acid, itaconic acid/trimethylolethane/(meth)acrylic acid, itaconic acid/trimethylolpropane/(meth)acrylic acid, itaconic acid/pentaerythritol/(meth)acrylic acid, maleic anhydride/trimethylolethane/(meth)acrylic acid, maleic anhydride/glycerol/(meth)acrylic acid, and the like; urethane (meth) acrylate obtained by reacting isocyanate-containing compounds with at least 2 moles of (meth)acrylic monomers having an active hydrogen atom per one molecule of the isocyanate; and tri (meth)acrylate of tris(2-hydroxyethyl) isocyanuric acid. Among them, those comprising the urethane acrylate are preferred in view of the surface hardness and weather resistance.

The isocyanate-containing compounds include polyisocyanate compounds such as diisocyanate compounds and triisocyanate compounds, and oligomeric polyisocyanate compounds obtained by oligomerizing the diisocyanate compounds. Examples of the diisocyanate compounds are tolylene diisocyanate, xylylene diisocyanate, diphenylmethane diisocyanate, isophorone diisocyanate, hexamethylene diisocyanate, dicyclohexylmethane diisocyanate, compounds obtained by hydrogenating the aromatic group of the above compounds having the aromatic group (e.g. hydrogenated xylylene diisocyanate, hydrogenated diphenylmethane diisocyanate, etc.), and the like, and examples of the triisocyanate compounds are triphenylmethane triisocyanate, dimethylenetriphenyl triisocyanate, and the like.

The heat polymerizable silane compound having at least two ether and/or ester groups in a molecule may be at least one compound of the formula:

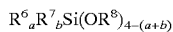  [2]

wherein $R^6$ and $R^7$ represent independently an alkyl, aryl, halogenated alkyl or halogenated aryl group, or an organic group which has an epoxy, amino, mercapto or cyano group and is bonded to the silicon atom through the terminal carbon atom, provided that each of $R^6$ and $R^7$ has 16 carbon atoms or less; $R^8$ is an alkyl, alkoxy or acyl group having 6 carbon atoms or less; a and b are each 0, 1 or 2, provided that the sum of a and b is 0, 1 or 2, or its oligomer, and it can be heat polymerized to cure.

Examples of the above heat polymerizable silane compound are tetraalkoxysilanes such as methyl silicate, ethyl silicate, n-propyl silicate, isopropyl silicate, n-butyl silicate, sec.-butyl silicate, tert.-butyl silicate, etc.; trialkoxysilanes, trialkoxyalkoxysilanes and triacyloxysilanes such as methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-glycidoxypropyltrimethoxysilane, γ-glycidoxypropyltriethoxysilane, γ-(β-glycidoxyethoxy) propyltrimethoxysilane, β-(3,4-epoxycyclohexyl) ethyltrimethoxysilane, β-(3,4-epoxycyclohexyl)-ethyltriethoxysilane, γ-methacryloyloxypropyltrimethoxysilane, γ-aminopropyltrimethoxysilane, γ-(β-aminoethyl) propyltrimethoxysilane, γ-mercaptopropyltrimethoxysilane, β-cyanoethylpropyltrimethoxysilane, etc.; dialkoxysilanes and diacyloxysilanes such as dimethyidimethoxysilane, phenylmethyldimethoxysilane, dimethyldiethoxysilane, phenylmethyldimethoxysilane, γ-glycidoxypropylmethyldimethoxysilane, γ-glycidoxypropylmethyldiethoxysilane, γ-glycidoxypropylphenyldimethoxysilane, γ-glycidoxypropylphenyldiethoxysilane, γ-chloropropylmethyldimethoxysilane, γ-chloropropylmethyldiethoxysilane, dimethyldiacetoxysilane, methylvinyldimethoxysilane, methylvinyldimethoxysilane, γ-methacryloyloxypropylmethyldimethoxysilane, γ-methacryloyloxypropylmethyldiethoxysilane, etc.; and the like. They may be used independently or in admixture thereof. Their mixture may be cohydrolyzed to form an oligomer and then heat polymerized.

Examples of the organic group for $R^1$ in the organopolysiloxane of the above formula [1] are $C_1$–$C_4$ alkyl groups such as methyl, ethyl and propyl groups, which may have one or more substituents (e.g. a hydroxyl group etc.); $C_6$–$C_8$ aryl groups such as phenyl and tolyl groups, which may have one or more substituents (e.g. a hydroxyl group etc.); $C_7$–$C_9$ aralkyl groups such as benzyl and phenetyl groups, which may have one or more substituents (e.g. a hydroxyl group etc.); and the like.

Examples of the alkylene group for $R^2$, $R^3$ and $R^4$ are $C_1$–$C_8$ alkylene groups such as methylene, ethylene and propylene groups, and $R^2$, $R^3$ and $R^4$ may be the same or different. Preferably, at least one of $R^3$ and $R^4$ is an ethylene or propylene group in view of the dissolved concentration of the electrolyte salt.

Examples of the organic group for $R^5$ are $C_1$–$C_5$ alkyl groups such as methyl, ethyl and propyl groups, which may have one or more substituents (e.g. a hydroxyl group etc.); and $C_2$–$C_6$ acyl groups such as acetyl and propionyl groups, which may have one or more substituents (e.g. a hydroxyl group etc.).

The sequences of the —Si(R$^1$)$_2$—O— and —Si(R$^1$)(R$^2$O—)—O— groups in the formula [1] are arbitrary, and each of the groups may be arranged in a block form, or they may be randomly arranged. Also, the sequences of the —R$^3$O— and —R$^4$O— groups may be arbitrary.

The above organosiloxane may be obtained by grafting a compound having an unsaturated bond and a polyalkyleneoxide group such as methoxypolyethylene glycol allyl ether onto an organopolysiloxane having a hydrogenated silicon group through a hydrosilylation reaction. In particular, the method described in British Polymer Journal, 20 (1988) 281–288 can be used.

The amount of the organopolysiloxane is between 0.05 and 20 wt. parts, preferably between 0.1 and 10 wt. parts per 100 wt. parts of the polymerizable compound.

When the amount of the organopolysiloxane is less than 0.05 wt. part, the obtained surface coating composition may not have the sufficient antistatic properties. When the amount exceeds 20 wt. parts, the cured film formed by curing the surface coating composition does not have sufficient hardness and the adhesion of the film to a substrate decreases.

Examples of the electrolyte salts are salts of thiocyanic acid, perchloric acid, trifluoromethanesulfonic acid and hydrohalogenic acids with a metal of the Groups I and II of the Periodic Table such as lithium, sodium, potassium, magnesium, calcium and barium.

Specific examples of the electrolyte salts are lithium iodide, lithium perchlorate, lithium thiocyanate, lithium borofluoride, lithium tetrafluoromethanesulfonate, sodium iodide, sodium perchlorate and barium iodide, which may be anhydrous or hydrous ones. They may be used independently or in admixture thereof.

The amount of the electrolyte salt is between 0.005 and 1.5 moles per one mole of [R$^3$O+R$^4$O] in view of the antistatic effect, transparency and the like, when the product of (moles of the organopolysiloxane) and (the total number of the R$^3$O and R$^4$O groups in a molecule) is expressed by [R$^3$O+R$^4$O] and used as a tentative mole number of the organopolysiloxane based on the R$^3$O and R$^4$O groups.

Preferably, the surface coating composition of the present invention may contain conventional polymerization initiators which can be used in the below described polymerization and curing method such as azo compounds (e.g. 2,2'-azobis(2,4-dimethylvaleronitrile), azobisisobutyronitrile, dimethyl-2,2'-azobisisobutyrate, etc.), peroxyesters (e.g. tert.-butyl peroxypivalate, tert.-butyl peroxy2-ethylhexanoate, cumyl peroxy2-ethylhexanoate, etc.), diacylperoxides (e.g. di-3,5,5-trimethylhexanoyl peroxide, benzoyl peroxide, dilauroyl peroxide, etc.); and polymerization accelerators, for example, photosensitizers such as carbonyl compounds (e.g. benzoin, benzoin methyl ether, benzoin ethyl ether, benzoin propyl ether, acetoin, benzil, benzophenone, p-methoxybenzophenone, etc.), tetramethylthiuram monosulfide, tetramethylthiuram disulfide, and the like.

The amount of the polymerization initiators and/or polymerization accelerators is usually between 0.1 and 10 wt. % based on the surface coating composition of the present invention.

Furthermore, the surface coating composition of the present invention may contain conventional additives such as UV absorbers, light stabilizers, antioxidants, anticlouding agents, colorants, and the like, in an amount that the properties of the cured film do not deteriorate.

Examples of the light stabilizers are hindered amines, hindered phenols, and the like.

Examples of the UV absorbers are commercially available benzotriazoles, benzophenones, hindered amines, and the like.

The molded articles of the synthetic resins covered with the cured film can be produced by applying the surface coating composition of the present invention onto the molded article to form a coating film, and then curing the film.

The molded article can be coated with the surface coating composition by dipping the molded article in the surface coating composition, or spraying or coating the surface coating composition on the molded article.

The surface coating composition may be diluted with a solvent such as alcohols, ketones, aromatics, esters and the like to make the application easy or to adjust the thickness of the coated film.

The coated film of the surface coating composition can be polymerized and cured by heat polymerization comprising heating the film, or photopolymerization comprising irradiating the actinic ray such as UV ray or electron beams. The polymerization method is selected according to the kind of the polymerizable compound.

In particular, it is easy and preferable to use the photopolymerizable compound having at least two (meth) acryloyloxy groups in a molecule as the photopolymerizable compound and to photopolymerize it.

The thickness of the cured film is usually between 0.5 and 50 μm, preferably between 1 and 20 μm in view of the mar resistance and flame retardance, as well as the prevention of peeling or cracking of the film.

Examples of the synthetic resins which forms the molded articles to be used in the present invention are polyolefins, acrylic resins, polystyrene, MS resins, AS resins, ABS resins, polycarbonate, cellulose acetate butyrate resins, and the like.

The shape of the molded article of such synthetic resin may be suitably selected according to the application of the article. A sheet and plate are preferred.

The surface coating composition of the present invention can prevent the inherent drawbacks of the synthetic resins such that they are easily flawed or electrostatically charged, when the composition is applied on the surfaces of the synthetic resin molded articles and cured.

Such the synthetic resin molded articles can be used in various applications such as indoor structural materials, nameplates, protective plates, displays, lighting units, electric parts, and the like.

EXAMPLES

The present invention will be explained further in detail by the following examples, in which the properties were evaluated as follows:

Surface hardness

The pencil hardness test was carried out according to JIS K 5400.

Surface resistivity

A resistivity per unit surface area was measured according to JIS K 6911.

Charged voltage

A charged voltage was measured with the application of 10 KV according to JIS L 1094.

Destaticizing property

A half-life period of the charged voltage was measured according to JIS L 1094.

Adhesion of coated film

A cross-cut test was carried out, and the number of peeled-off sections per 100 cross-cut sections were counted according to JIS K 5400.

Light transmission in whole wavelength range of visible light

Brightness of a sample, which was expressed by a percentage of a whole transmitted light through the sample per an amount of incident visible light, was measured according to ASTM D 1003.

Clouding value

Clarity of a sample was measured according to ASTM D 1003.

Examples 1 to 5 and Comparative Examples 1 to 3

A surface coating composition was prepared by adding and mixing an organopolysiloxane of the formula [1] wherein $R^1$ is a methyl group, $R^2$ is a propylene group, $R^3$ is an ethylene group, $R^4$ is a propylene group, $R^5$ is a methyl group, m is 30, n is 3, a is 10 and b is 0 in an amount shown in Table 1 and lithium perchlorate in an amount of two thirds of that of the organopolysiloxane to a urethane-modified (meth)acrylic oligomer hard coating agent (KOEI HARD M 101 manufactured by KOEI Chemical Co., Ltd. oligomer content: 100 wt. parts. toluene: 25 wt. parts) (125 wt. parts).

A molar ratio of lithium perchlorate to (the mole number of the organopolysiloxane)×(the total number of the $R^3O$ and $R^4O$ groups in a molecule) in this surface coating composition was 0.86.

The surface coating composition was coated on an acrylic resin plate (SUMIPEX E manufactured by Sumitomo Chemical Co., Ltd. thickness of 8 mm), dried at room temperature for 20 minutes and then UV cured by irradiating with a metal halide lamp of 120 W from a distance of 20 cm for 10 seconds, and a cured film having a thickness of 15 μm was formed on the surface of the plate.

Properties of the obtained resin plate coated with the cured film were measured at 23° C., 35% RH. The results are shown in Table 1.

Examples 6 to 8

A resin plate coated with a cured film was prepared in the same manner as in Example 1 except that 1 wt. part of an organopolysiloxane shown in Table 2 and ⅔ wt. part of lithium perchlorate were used per 125 wt. parts of the urethane-modified (meth)acrylic oligomer hard coating agent. The results are shown in Table 3.

TABLE 2

| Example No. | 6 | 7 | 8 |
|---|---|---|---|
| $R^1$ | Methyl | Methyl | Methyl |
| $R^2$ | Propylene | Propylene | Propylene |
| $R^3$ | Ethylene | Ethylene | Ethylene |
| $R^4$ | Propylene | Propylene | Propylene |
| $R^5$ | Methyl | Methyl | Methyl |
| m | 30 | 10 | 3 |
| n | 10 | 5 | 2 |
| a | 0 | 10 | 10 |
| b | 10 | 0 | 0 |
| Molar ratio[1] of electrolyte salt | 0.6 | 0.5 | 0.5 |

Note:
[1] A molar ratio in relation to (the mole number of the organopolysiloxane) × (the total number of the $R^3O$ and $R^4O$ groups in a molecule).

TABLE 1

| | Polysiloxane (wt. parts) | Pencil hardness | Surface resistivity (Ω) | Destaticizing property (sec.) | Charged voltage (KV) | Adhesion | Light transmission in whole wavelength range (%) | Clouding value (%) |
|---|---|---|---|---|---|---|---|---|
| C. Ex. 1 | 0 | 5H | 9.7 × 10¹⁵ | >180 | 2.09 | 0 | 92.9 | 0.1 |
| C. Ex. 2 | 0.01 | 5H | 5.8 × 10¹⁵ | >180 | 2.04 | 0 | 92.8 | 0.3 |
| Ex. 1 | 0.5 | 5H | 9.2 × 10¹³ | 110 | 1.93 | 0 | 92.8 | 0.3 |
| Ex. 2 | 1.0 | 5H | 7.6 × 10¹³ | 30 | 1.93 | 0 | 92.7 | 0.4 |
| Ex. 3 | 5.0 | 5H | 9.6 × 10¹² | 3 | 1.77 | 0 | 92.9 | 0.4 |
| Ex. 4 | 10.0 | 5H | 5.4 × 10¹² | 3 | 1.22 | 0 | 92.8 | 0.6 |
| Ex. 5 | 20.0 | 5H | 0.8 × 10¹² | 2 | 1.09 | 0 | 92.8 | 1.6 |
| C. Ex. 3 | 30.0 | 3H | 9.4 × 10¹¹ | 1 | 0.98 | 100 | 92.7 | 1.7 |

TABLE 3

| | Pencil hardness | Surface resistivity (Ω) | Destaticizing property (sec.) | Charged voltage (KV) | Adhesion | Light transmission in whole wavelength range (%) | Clouding value (%) |
|---|---|---|---|---|---|---|---|
| Ex. 6 | 5H | 8.2 × 10¹³ | 90 | 1.93 | 0 | 92.8 | 0.5 |
| Ex. 7 | 5H | 1.9 × 10¹³ | 12 | 1.71 | 0 | 92.8 | 0.4 |
| Ex. 8 | 5H | 2.8 × 10¹² | 3 | 1.34 | 0 | 92.9 | 0.3 |

Comparative Example 4-1

A resin plate coated with a cured film was prepared in the same manner as in Example 1 except that lauryltrimethylammonium chloride (COATAMINE 24P manufactured by KAO) (2 wt. parts) was used in place of the organopolysiloxane and lithium perchlorate. The results are shown in Table 4.

Comparative Example 4-2

A resin plate coated with a cured film was prepared in the same manner as in Comparative Example 4-1 except that the properties were measured at 70% RH. The results are shown in Table 4.

Comparative Example 5-1

A resin plate coated with a cured film was prepared in the same manner as in Comparative Example 4-1 except that sodium dialkylsulfosuccinate (PELEX manufactured by KAO) (0.5 wt. part) was used in place of lauryltrimethylammonium chloride. The results are shown in Table 4.

Comparative Example 5-2

A resin plate coated with a cured film was prepared in the same manner as in Comparative Example 5-1 except that the properties were measured at 70% RH. The results are shown in Table 4.

TABLE 4

| | Humidity (%) | Pencil hardness | Surface resistivity (Ω) | Destaticizing property (sec.) | Charged voltage (KV) | Adhesion | Light transmission in whole wavelength range (%) | Clouding value (%) |
|---|---|---|---|---|---|---|---|---|
| C. Ex. 4-1 | 35 | 5H | $1.2 \times 10^{15}$ | >180 | 2.09 | 0 | 92.2 | 1.1 |
| C. Ex. 4-2 | 70 | 5H | $4.8 \times 10^{13}$ | 25 | 1.93 | 0 | 92.1 | 1.4 |
| C. Ex. 5-1 | 35 | 5H | $5.7 \times 10^{14}$ | 175 | 2.04 | 0 | 92.8 | 0.7 |
| C. Ex. 5-2 | 70 | 5H | $6.4 \times 10^{13}$ | 55 | 1.93 | 0 | 92.4 | 0.9 |

What is claimed is:

1. A surface coating composition comprising
   (1) 100 wt. parts of a polymerizable compound selected from the group consisting of i) photopolymerizable compounds having at least two (meth)acryloyloxy groups in a molecule and ii) heat polymerizable silane compounds having at least two functional groups selected from the group consisting of ether groups and ester groups in a molecule,
   (2) 0.05 to 20 wt. parts of an organopolysiloxane of the formula [1]:

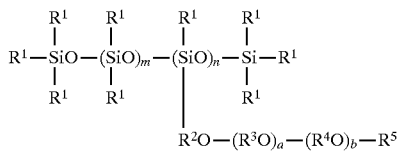

$$R^2O-(R^3O)_a-(R^4O)_b-R^5$$

wherein $R^1$ represents a monovalent organic group, $R^2$ to $R^4$ represent independently an alkylene group, $R^5$ represents a hydrogen atom or a monovalent organic group, m is an integer of 0 to 100, n is an integer of 1 to 100, and each of a and b is an integer of 0 to 100, provided that a and b are not 0 (zero) at the same time, and wherein sequences of the $-Si(R^1)_2-O-$ and $-Si(R^1)(R^2O-)-O-$ groups and of the $-R^3O-$ and $-R^4O-$ groups are arbitrary, and (3) 0.005 to 1.5 moles of an electrolyte salt per one mole of $[R^3O+R^4O]$ which is (moles of the organopolysiloxane)×(the total number of the $R^3O$ and $R^4O$ groups in a molecule).

2. The surface coating composition according to claim 1, wherein said polymerizable compound (1) is a photopolymerizable compound having at least two (meth)acryloyloxy groups in a molecule.

3. The surface coating composition according to claim 2, wherein said photopolymerizable compound having at least two (meth)acryloyloxy groups in a molecule is a urethane (meth)acrylate.

4. The surface coating composition according to claim 1, wherein at least one of $R^3$ and $R^4$ in the formula [1] representing said organopolysiloxane is an ethylene or propylene group.

5. A cured film obtained by polymerizing a surface coating composition as claimed in claim 1.

6. The cured film according to claim 5, wherein said polymerizable compound (1) in the surface coating composition is a photopolymerizable compound having at least two (meth)acryloyloxy groups in a molecule.

7. The cured film according to claim 5 or 6, which has a thickness of between 0.5 and 50 μm.

8. A synthetic resin molded article having a surface of which is coated with a cured film as claimed in claim 5.

9. The synthetic resin molded article according to claim 8, wherein said cured film is a cured film as claimed in claim 6.

10. The synthetic resin molded article according to claim 8 or 9, wherein said cured film has a thickness of between 0.5 and 50 μm.

11. A method for forming a cured film comprising photopolymerizing or heat polymerizing a surface coating composition as claimed in claim 1.

12. The method according to claim 11, wherein said polymerizable compound (1) in the surface coating composition is a photopolymerizable compound having at least two (meth)acryloyloxy groups in a molecule.

13. A method for forming a cured film on a surface of a synthetic resin molded article comprising the steps of:
   coating a surface of the synthetic resin molded article with a surface coating composition as claimed in claim 1, and
   polymerizing said surface coating composition with light or heat.

14. The method according to claim 13, wherein said polymerizable compound (1) in the surface coating composition is a photopolymerizable compound having at least two (meth)acryloyloxy groups in a molecule.

15. A synthetic resin molded article having formed on the surface thereof a cured surface coating composition as claimed in claim 1.

16. The synthetic resin molded article according to claim 15, wherein said polymerizable compound (1) in the surface coating composition is a photopolymerizable compound having at least two (meth)acryloyloxy groups in a molecule.

17. The surface coating composition according to claim 1, wherein said organopolysiloxane is present in an amount of 0.1 to 10 wt. parts.

18. The method according to claim 11, wherein said organopolysiloxane is present in an amount of 0.1 to 10 wt. parts.

* * * * *